US011125005B2

(12) United States Patent
Yao

(10) Patent No.: US 11,125,005 B2
(45) Date of Patent: Sep. 21, 2021

(54) AUTOMATIC SWITCHING DEVICE AND REFRIGERATION DEVICE

(71) Applicants: HEFEI HUALING CO., LTD., Hefei (CN); HEFEI MIDEA REFRIGERATOR CO., LTD., Hefei (CN); MIDEA GROUP CO., LTD., Foshan (CN)

(72) Inventor: Jun Yao, Hefei (CN)

(73) Assignees: HEFEI HUALING CO., LTD., Hefei (CN); HEFEI MIDEA REFRIGERATOR CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 267 days.

(21) Appl. No.: 16/445,010

(22) Filed: Jun. 18, 2019

(65) Prior Publication Data
US 2019/0301228 A1    Oct. 3, 2019

Related U.S. Application Data

(63) Continuation of application No. PCT/CN2017/075245, filed on Feb. 28, 2017.

(30) Foreign Application Priority Data

Dec. 21, 2016   (CN) .......................... 201611190248.4

(51) Int. Cl.
*E05F 15/00* (2015.01)
*E05F 15/603* (2015.01)
(Continued)

(52) U.S. Cl.
CPC .......... *E05F 15/603* (2015.01); *E05F 15/619* (2015.01); *E05F 15/70* (2015.01);
(Continued)

(58) Field of Classification Search
CPC ....... E05F 15/614; E05F 15/603; E05F 15/75; E05F 15/70; E05F 15/619;
(Continued)

(56) References Cited

U.S. PATENT DOCUMENTS

| 8,454,102 | B2 | 6/2013 | Kim |
| 9,534,829 | B2 * | 1/2017 | Held ..................... F25D 23/028 |

(Continued)

FOREIGN PATENT DOCUMENTS

| CN | 104328971 A | 2/2015 |
| CN | 104567217 A | 4/2015 |

(Continued)

OTHER PUBLICATIONS

International Search Report, dated Aug. 25, 2017, for International Application No. PCT/CN2017/075245, 6 pages.

*Primary Examiner* — Chi Q Nguyen
(74) *Attorney, Agent, or Firm* — Seed IP Law Group LLP

(57) ABSTRACT

One or more embodiments of an automatic switching device and a refrigeration device is provided. The automatic switching device includes an ejection structure including a transmission gear and a rack matching the transmission gear in transmission. The automatic switching device includes a driving device, connected to the transmission gear and used for driving the transmission gear to rotate, so as to drive the rack to extend forwards to open a door body or retract backwards to close the door body. The automatic switching device further includes an auxiliary control device including an inductor arranged on the rack, a first induction switch and a second induction switch.

15 Claims, 9 Drawing Sheets

(51) Int. Cl.
  *E05F 15/70* (2015.01)
  *E05F 15/619* (2015.01)
  *E05F 15/75* (2015.01)
  *H02K 7/116* (2006.01)

(52) U.S. Cl.
  CPC ........... *E05F 15/75* (2015.01); *E05Y 2900/31* (2013.01); *H02K 7/116* (2013.01)

(58) Field of Classification Search
  CPC ........... E05Y 2400/338; E05Y 2900/31; E05Y 2201/426; E05Y 2400/445; E05Y 2201/624; E05Y 2900/20; A47B 88/457
  USPC ..... 49/139, 287, 280; 312/319.6, 319.7, 405
  See application file for complete search history.

(56) References Cited

U.S. PATENT DOCUMENTS

| | | | |
|---|---|---|---|
| 10,364,599 B2 * | 7/2019 | Lee | E05F 15/616 |
| 10,577,843 B2 * | 3/2020 | Lee | E05D 3/14 |
| 2011/0048060 A1 * | 3/2011 | Kim | E05B 17/0029 |
| | | | 62/449 |
| 2011/0083461 A1 * | 4/2011 | Kim | F25D 23/028 |
| | | | 62/264 |
| 2013/0154461 A1 * | 6/2013 | Bohle | E05F 15/614 |
| | | | 312/319.6 |
| 2014/0306596 A1 | 10/2014 | Linke | |
| 2015/0338156 A1 | 11/2015 | Held | |
| 2016/0146530 A1 | 5/2016 | Jung | |
| 2018/0187470 A1 * | 7/2018 | Song | F25D 11/02 |
| 2018/0223582 A1 * | 8/2018 | Shin | E05F 15/73 |
| 2019/0330909 A1 * | 10/2019 | Lee | F25D 23/028 |
| 2020/0263918 A1 * | 8/2020 | Lee | E05F 17/004 |

FOREIGN PATENT DOCUMENTS

| | | |
|---|---|---|
| CN | 105298276 A | 2/2016 |
| CN | 106050047 A | 10/2016 |
| CN | 106437391 A | 2/2017 |
| EP | 2 194 347 A2 | 6/2010 |
| EP | 2194347 A2 | 6/2010 |
| JP | 2001-55863 A | 2/2001 |
| JP | 2006-78058 A | 3/2006 |
| JP | 2008-8562 A | 1/2008 |
| KR | 10-1997-0011734 A | 3/1997 |

* cited by examiner

AUTOMATIC SWITCHING DEVICE AND REFRIGERATION DEVICE

CROSS-REFERENCE TO RELATED APPLICATIONS

The present application is a continuation of and claims priority and benefit to PCT Application No. PCT/CN2017/075245, filed on Feb. 28, 2017, which claim priority and benefit to Chinese Patent Application No. 201611190248.4, filed on Dec. 21, 2016, and entitled "AUTOMATIC SWITCHING DEVICE AND REFRIGERATION DEVICE", the entire contents of which are herein incorporated by reference.

BACKGROUND

Technical Field

The present disclosure relates to the field of kitchen appliances, in particular to an automatic switching device and a refrigeration device.

Description of the Related Art

At present, when the door body of the existing refrigerator is required to open, due to the magnetic force of the magnetic stripe of the sealing strip and the negative pressure of the internal space, a user needs to apply a large force, usually 40 N to 70 N to open the door body, which brings inconvenience during operation, especially to the people with less physical strength, such as older people and children. In related arts, the function of assisting opening the door can be realized by arranging an automatic ejection structure on the door body or the cabinet body of the refrigerator, but the following defects are still present.

1) When the user prepares to take an object after opening the door, an external force needs to be applied to balance the resilience of an elastic member so as to prevent the door body from rebounding immediately, which is inconvenient to operate.

2) The transmission gear used in the existing automatic ejection structure has a transmission gear locally. On the one hand, the transmission gear needs to be processed twice to obtain the local transmission gear. On the other hand, the setting mode of the local transmission gear causes an uncontrollable ejection stroke.

BRIEF SUMMARY

In the disclosed techniques, an automatic switching device is provided in an embodiment of a first aspect of the present disclosure. The automatic switching device is applicable to a refrigeration device, which comprises a cabinet body and a door body connected with the cabinet body. The automatic switching device is installed on the cabinet body. The automatic switching device comprises: an ejection structure, comprising a transmission gear and a rack matching the transmission gear in transmission; a driving device, connected to the transmission gear and used for driving the transmission gear to rotate, so as to drive the rack to extend forwards to open the door body or retract backwards to close the door body; and an auxiliary control device comprising an inductor arranged on the rack, a first induction switch and a second induction switch, the first induction switch and the second induction switch being connected to the driving device respectively; in the case that the inductor moves to the position of the first induction switch, by generating a first control signal, the first induction switch controls the driving device to stop working so as to cause the door body to be in an opened state; and in the case that the inductor moves to the position of the second induction switch, by generating a second control signal, the second induction switch controls the driving device to stop working so as to cause the door body to reset to a closed state.

In the technical solution, the automatic switching device is arranged on the cabinet body of the refrigeration device; the automatic switching device comprises the ejection structure, the driving device and the auxiliary control device, wherein the ejection structure comprises a straight transmission gear and a rack matching the straight transmission gear, the driving device drives the transmission gear to rotate positively to realize forward movement of the rack engaged with the transmission gear and open the door body through ejection, and the driving device drives the transmission gear to rotate reversely to realize backward movement of the rack engaged with the transmission gear so as to cause the door body to reset to be closed.

The inductor is arranged on the rack, and can move forwards and backwards along with the rack, the first induction switch and the second induction switch are respectively arranged at specified positions on the moving path of the rack, and the first induction switch is closer to the door body than the second induction switch. When the introducer moves to the position of the first induction switch along with the rack, by inducing with the first induction switch, the first induction switch generates the first control signal to control the driving device to stop working; at this time, the rack extends out to open the door body, the door body is in an opened state, and the second induction switch is activated to work. After a specified period of time, the driving device drives the transmission gear to rotate reversely, so that the rack moves in a reverse direction until the inductor induces with the second induction switch, and the second induction switch generates the second control signal to control the driving device to stop working so as to cause the door body to reset to be closed.

The stroke of the rack can be controlled by arranging the induction switches while automatic opening and closing of the door body are realized. When the maximum stroke is reached, that is, when the first induction switch is triggered to generate an induction signal to keep the door body in the open state for a specified period of time, the door body is automatically closed. On the one hand, after the door body is opened, the door body is automatically in an opened state because the rack is in the extended state, and no external force is required for keeping the state; and on the other hand, as the transmission gear adopts standard parts, the production cost is low, the induction switches are arranged to realize the controllable stroke, the driving device is automatically controlled to stop working after a specified stroke is completed, and the control precision is high.

The induction switch may be a switch based on electromagnetic induction or a switch based on infrared induction, microwave induction or photoelectric induction.

The automatic switching device may be either individually arranged at the upper or lower end of the cabinet body or respectively arranged at the upper and lower ends of the cabinet body.

In addition, the automatic switching device in the above embodiment provided by the present disclosure may also have the following additional technical features.

In the above technical solution, preferably, the automatic switching device further comprises a box body installed on the cabinet body, wherein the box body comprises a first receiving portion and a second receiving portion; the rack, the first induction switch and the second induction switch are installed in the first receiving portion, a sidewall of the first receiving portion opposite to the door body is provided with a notch, and the rack extends out of the notch to eject the door body out; the driving device is installed in the second receiving portion; and the first induction switch is closer to the notch than the second induction switch.

In the above technical solution, the automatic switching device further comprises a box body arranged outside and functioning for containing, wherein specifically, the box body comprises a first receiving portion and a second receiving portion; the first receiving portion is used for installing the rack, the first induction switch and the second induction switch, a sidewall of the first receiving portion opposite to the door body is provided with the notch, and the first induction switch is closer to the notch than the second induction switch. The rack extends out of the notch to eject the door body out to realize automatic opening of the door body. The box body is arranged to realize integral modularized assembly of the ejection structure, the driving device and the auxiliary control device, so that the assembly process is simplified and the disassembly is convenient; and the box body is arranged, which is beneficial to improving the assembly strength of the automatic switching device and prolonging the service life.

In any one of the above technical solutions, preferably, the automatic switching device further comprises a sliding portion, arranged in the second receiving portion and connected to the driving device, wherein the side wall of the second receiving portion opposite to the door body is provided with a chute; a paddle is arranged at a position where the sliding portion matches the chute, the paddle extends to the outside of the second receiving portion by the chute, and the paddle drives the transmission gear to disengage from the rack in the case that the paddle is subjected to an external force.

In the technical solution, by arranging the sliding portion in the second receiving portion and connecting the sliding portion to the driving device, when sliding forwards and backwards, the sliding portion drives the driving device to move forwards and backwards. Moreover, the chute is arranged on the side wall of the second receiving portion opposite to the door body, the paddle capable of moving along the chute is arranged at a position where the sliding portion matches the chute. When the automatic door opening function or automatic door closing function of the automatic switching device is abnormal, the paddle is stirred manually to drive the driving device to retreat until the transmission gear disengages from the rack, and then the rack is reset to realize manual closing of the door body, thereby preventing the condition that the door body cannot be closed when an abnormal condition occurs.

Specifically, when an abnormal condition (such as fault of the driving device, power off, etc.) occurs to the ejection structure, the rack and the transmission gear stop urgently in a moving state, and if the rack has extended a certain length at this moment, the door body cannot be normally closed. As the paddle, the sliding portion, and the driving device can be regarded as a whole, by stirring the paddle, the paddle slides along the chute until the driving device drives the transmission gear to disengage from the rack, the rack is manually reset, and then the corresponding door body can be manually closed.

In any one of the above technical solutions, preferably, the area on the cabinet body away from the connection portion of the cabinet body and the door body is provided with a containing groove, and the box body is arranged in the containing groove.

In the technical solution, the containing groove is arranged on the cabinet body to install the box body. On the one hand, the overall good appearance of the refrigeration device can be prevented from being affected by the automatic switching device, and on the other hand, the containing groove is formed at a position away from the connection portion (such as a hinge, etc.) of the cabinet body and the door body, so that the ejection operation is easier.

In any one of the above technical solutions, preferably, the area of the rack opposite to the notch is provided with an elastic portion.

In the technical solution, by arranging the elastic portion in the area of the rack opposite to the notch, when the rack abuts against the door body, the elastic portion generates elastic deformation, so that soft contact between the rack and the door body is achieved to prevent generation of a dent when the rack abuts against the door body.

Moreover, the elastic portion may also be arranged in an area opposite to the door body.

Specifically, the elastic portion is a rubber fitting or other suitable material.

In any one of the above technical solutions, the automatic switching device further comprises an elastomer, of which one end is connected to the first receiving portion and the other end is connected to the rack, wherein the elastomer is used for pulling the rack back to reset after the transmission gear disengages from the rack.

In the technical solution, by arranging the elastomer in the first receiving portion, connecting one end of the elastomer to the first receiving portion and connecting the other end of the elastomer to the rack, the elastomer is in a tension state when the rack moves towards the direction of the door body, and in the case that the door body needs to be closed manually when the automatic switching device is abnormal, the rack is pulled back to reset through resilience of the elastomer, thus simplifying operation for users.

Specifically, the elastomer is a spring.

In any one of the above technical solutions, preferably, the driving device comprises a driving motor and a reduction box connected to the driving motor, wherein the free end of the reduction box is provided with a rotating shaft, and the driving device is connected to the transmission gear through the rotating shaft to drive the transmission gear to rotate.

In the technical solution, the driving device comprises a driving motor and a reduction box, and the free end of the reduction box is provided with a rotating shaft matching the transmission gear. The rotating shaft drives the transmission gear to rotate through matching of the driving motor and the reduction box to drive the rack to move, thereby being capable of reducing the rotating speed, preventing intense wear and noise between the transmission gear and the rack resulting from too fast rotation of the transmission gear, and improving the service lives of the transmission gear and the rack.

In any one of the above technical solutions, preferably, the inductor is a magnet, the first induction switch is a first Hall switch, and the second induction switch is a second Hall switch, wherein when the magnet and the first Hall switch send electromagnetic induction, the first Hall switch generates the first control signal, and when the magnet and the second Hall switch send electromagnetic induction, the second Hall switch generates the second control signal.

In the technical solution, by arranging the inductor as a magnet and arranging both the first induction switch and the second induction switch as Hall switches, when the magnetic field of the magnet on the rack is induced by the first Hall switch, the first Hall switch outputs the first control signal to a control circuit, and the control circuit cuts off the power of the driving motor according to the received first control signal to realize ejection and hovering of the rack so as to open the door body through ejection.

After a predetermined period of time, by inputting a reverse current to the driving motor, the driving motor drives the transmission gear to rotate reversely, the transmission gear drives the rack to move in an opposite direction until the magnet on the rack is induced by the second Hall switch, the second Hall switch outputs the second control signal to the control circuit, and the control circuit cuts off the power of the driving motor to reset the entire device.

An electromagnetic induction method is adopted to realize a controllable stroke. Compared with infrared induction, photoelectric induction and other methods, the electromagnetic induction method is low in cost, high in reliability, and easy to apply.

In any one of the above technical solutions, preferably, the automatic switching device further comprises a touch switch arranged on a handle area of the door body, wherein the touch switch is connected to the driving device.

In the technical solution, by arranging the touch switch on the handle of the door body and connecting the touch switch to the driving device, when the user needs to open the door, by touching the touch switch, the driving device starts operation to drive the transmission gear to rotate so as to drive the rack to eject the door body out. When arriving at the area of the first Hall switch, the magnet sends the first control signal by generating electromagnetic induction with the first Hall switch; at this time, the driving device stops working, and after a specified period of time or through touching the touch switch again by the user, the transmission gear rotates reversely to drive the rack to retreat so as to realize reset of the door body, which is convenient to operate.

In addition, the touch switch may also be replaced by an induction switch or a voice operated switch or the like.

In any one of the above technical solutions, preferably, the automatic switching device further comprises a door closer arranged on the connecting portion, wherein the door closer comprises a torsion ring for realizing reset of the rack by rebounding after the rack extends forwards to open the door body.

In the technical solution, by adding the torsion ring on the connection portion to serve as the door closer, in a door opening process, the torsion spring accumulates elastic potential energy through elastic deformation, and in a door closing process, the torsion spring releases elastic potential energy through recovery to the original state to further realize automatic closing of the door body.

An automatic switching device is provided in an embodiment of a second aspect of the present disclosure. The automatic switching device is applicable to a refrigeration device, which comprises a cabinet body and a door body connected with the cabinet body, wherein the automatic switching device is installed on the door body; the automatic switching device comprises: an ejection structure, comprising a transmission gear and a rack matching the transmission gear in transmission; a driving device, connected to the transmission gear and used for driving the transmission gear to rotate, so as to drive the rack to extend forwards to open the door body or retract backwards to close the door body; and an auxiliary control device comprising an inductor arranged on the rack, a first induction switch and a second induction switch, the first induction switch and the second induction switch being connected to the driving device respectively; in the case that the inductor moves to the position of the first induction switch, by generating a first control signal, the first induction switch controls the driving device to stop working so as to cause the door body to be in an opened state; and in the case that the inductor moves to the position of the second induction switch, by generating a second control signal, the second induction switch controls the driving device to stop working so as to cause the door body to reset to a closed state.

In the technical solution, the automatic switching device is arranged on the door body of the refrigeration device; the automatic switching device comprises the ejection structure, the driving device and the auxiliary control device, wherein the ejection structure comprises a straight transmission gear and a rack matching the straight transmission gear, the driving device drives the transmission gear to rotate positively to realize forward movement of the rack engaged with the transmission gear and open the door body through ejection by abutting against the cabinet body, and the driving device drives the transmission gear to rotate reversely to realize backward movement of the rack engaged with the transmission gear so as to cause the door body to reset to be closed.

The inductor is arranged on the rack, and can move forwards and backwards along with the rack, the first induction switch and the second induction switch are respectively arranged at specified positions on the moving path of the rack, and the first induction switch is closer to the cabinet body than the second induction switch. When the introducer moves to the position of the first induction switch along with the rack, by inducing with the first induction switch, the first induction switch generates the first control signal to control the driving device to stop working; at this time, the rack extends out to open the door body, the door body is in an opened state, and the second induction switch is activated to work. After a specified period of time, the driving device drives the transmission gear to rotate reversely, so that the rack moves in a reverse direction until the inductor induces with the second induction switch, and the second induction switch generates the second control signal to control the driving device to stop working so as to cause the door body to reset to be closed.

The stroke of the rack can be controlled by arranging the induction switches while automatic opening and closing of the door body are realized. When the maximum stroke is reached, that is, when the first induction switch is triggered to generate an induction signal to keep the door body in the open state for a specified period of time, the door body is automatically closed. On the one hand, after the door body is opened, the door body is automatically in an opened state because the rack is in the extended state, and no external force is required for keeping the state; and on the other hand, as the transmission gear adopts standard parts, the production cost is low, the induction switches are arranged to realize the controllable stroke, the driving device is automatically controlled to stop working after a specified stroke is completed, and the control precision is high.

The induction switch may be a switch based on electromagnetic induction or a switch based on infrared induction, microwave induction or photoelectric induction.

The automatic switching device may be either individually arranged at the upper or lower end of the cabinet body or respectively arranged at the upper and lower ends of the cabinet body.

In any one of the above technical solutions, preferably, the automatic switching device further comprises a box body installed on the door body, wherein the box body comprises a first receiving portion and a second receiving portion; the rack, the first induction switch and the second induction switch are installed in the first receiving portion, a sidewall of the first receiving portion opposite to the cabinet body is provided with a notch, and the rack extends out of the notch to eject the door body out; the driving device is installed in the second receiving portion; and the first induction switch is closer to the notch than the second induction switch.

In the above technical solution, the automatic switching device further comprises a box body arranged outside and functioning for containing, wherein specifically, the box body comprises a first receiving portion and a second receiving portion; the first receiving portion is used for installing the rack, the first induction switch and the second induction switch, a sidewall of the first receiving portion opposite to the cabinet body is provided with a notch, and the first induction switch is closer to the notch than the second induction switch. The rack extends out of the notch to eject the door body out to realize automatic opening of the door body. The box body is arranged to realize integral modularized assembly of the ejection structure, the driving device and the auxiliary control device, so that the assembly process is simplified and the disassembly is convenient; and the box body is arranged, which is beneficial to improving the assembly strength of the automatic switching device and prolonging the service life.

In any one of the above technical solutions, preferably, the automatic switching device further comprises a sliding portion, arranged in the second receiving portion and connected to the driving device, wherein the side wall of the second receiving portion opposite to the cabinet body is provided with a chute; a paddle is arranged at a position where the sliding portion matches the chute, the paddle extends to the outside of the second receiving portion by the chute, and the paddle drives the transmission gear to disengage from the rack in the case that the paddle is subjected to an external force.

In the technical solution, by arranging the sliding portion in the second receiving portion and connecting the sliding portion to the driving device, when sliding forwards and backwards, the sliding portion drives the driving device to move forwards and backwards. Moreover, the chute is arranged on the side wall of the second receiving portion opposite to the cabinet body, the paddle capable of moving along the chute is arranged at a position where the sliding portion matches the chute. When the automatic door opening function or automatic door closing function of the automatic switching device is abnormal, the paddle is stirred manually to drive the driving device to retreat until the transmission gear disengages from the rack, and then the rack is reset to realize manual closing of the door body, thereby preventing the condition that the door body cannot be closed when an abnormal condition occurs.

Specifically, when an abnormal condition (such as fault of the driving device, power off, etc.) occurs to the ejection structure, the rack and the transmission gear stop urgently in a moving state, and if the rack has extended a certain length at this moment, the door body cannot be normally closed. As the paddle, the sliding portion, and the driving device can be regarded as a whole, by stirring the paddle, the paddle slides along the chute until the driving device drives the transmission gear to disengage from the rack, the rack is manually reset, and then the corresponding door body can be manually closed.

In any one of the above technical solutions, preferably, the area on the door body away from the connection portion of the cabinet body and the door body is provided with a containing groove, and the box body is arranged in the containing groove.

In the technical solution, the containing groove is arranged on the door body to install the box body. On the one hand, the overall good appearance of the refrigeration device can be prevented from being affected by the automatic switching device, and on the other hand, the containing groove is formed at a position away from the connection portion (such as a hinge, etc.) of the cabinet body and the door body, so that the ejection operation is easier.

In any one of the above technical solutions, preferably, the area of the rack opposite to the notch is provided with an elastic portion.

In the technical solution, by arranging the elastic portion in the area of the rack opposite to the notch, when the rack abuts against the cabinet body, the elastic portion generates elastic deformation, so that soft contact between the rack and the cabinet body is achieved to prevent generation of a dent when the rack abuts against the cabinet body.

Moreover, the elastic portion may also be arranged in an area opposite to the cabinet body.

Specifically, the elastic portion is a rubber fitting.

In any one of the above technical solutions, the automatic switching device further comprises an elastomer, of which one end is connected to the first receiving portion and the other end is connected to the rack, wherein the elastomer is used for pulling the rack back to reset after the transmission gear disengages from the rack.

In the technical solution, by arranging the elastomer in the first receiving portion, connecting one end of the elastomer to the first receiving portion and connecting the other end of the elastomer to the rack, the elastomer is in a tension state when the rack moves towards the direction of the door body, and in the case that the door body needs to be closed manually when the automatic switching device is abnormal, the rack is pulled back to reset through resilience of the elastomer, thus simplifying operation of users.

Specifically, the elastomer is a spring.

In any one of the above technical solutions, preferably, the driving device comprises a driving motor and a reduction box connected to the driving motor, wherein the free end of the reduction box is provided with a rotating shaft, and the driving device is connected to the transmission gear through the rotating shaft to drive the transmission gear to rotate.

In the technical solution, the driving device comprises a driving motor and a reduction box, and the free end of the reduction box is provided with a rotating shaft matching the transmission gear. The rotating shaft drives the transmission gear to rotate through matching of the driving motor and the reduction box to drive the rack to move, thereby being capable of reducing the rotating speed, preventing intense wear and noise between the transmission gear and the rack resulted from too fast rotation of the transmission gear, and improving the service lives of the transmission gear and the rack.

In any one of the above technical solutions, preferably, the inductor is a magnet, the first induction switch is a first Hall switch, and the second induction switch is a second Hall switch, wherein in the case that the magnet and the first Hall switch send electromagnetic induction, the first Hall switch generates the first control signal, and in the case that the magnet and the second Hall switch send electromagnetic induction, the second Hall switch generates the second control signal.

In the technical solution, by arranging the inductor as a magnet and arranging both the first induction switch and the second induction switch as Hall switches, when the magnetic field of the magnet on the rack is induced by the first Hall switch, the first Hall switch outputs the first control signal to a control circuit, and the control circuit cuts off the power of the driving motor according to the received first control signal to realize ejection and hovering of the rack so as to open the door body through ejection.

After a predetermined period of time, by inputting a reverse current to the driving motor, the driving motor drives the transmission gear to rotate reversely, the transmission gear drives the rack to move in an opposite direction until the magnet on the rack is induced by the second Hall switch, the second Hall switch outputs the second control signal to the control circuit, and the control circuit cuts off the power of the driving motor to reset the entire device.

An electromagnetic induction method is adopted to realize a controllable stroke. Compared with infrared induction, photoelectric induction and other methods, the electromagnetic induction method is low in cost, high in reliability, and easy to apply.

In any one of the above technical solutions, preferably, the automatic switching device further comprises a touch switch arranged on a handle area of the door body, wherein the touch switch is connected to the driving device.

In the technical solution, by arranging the touch switch on the handle of the door body and connecting the touch switch to the driving device, when the user needs to open the door, by touching the touch switch, the driving device starts operation to drive the transmission gear to rotate so as to drive the rack to eject the door body out. When arriving at the area of the first Hall switch, the magnet sends the first control signal by generating electromagnetic induction with the first Hall switch; at this time, the driving device stops working, and after a specified period of time or through touching the touch switch again by the user, the transmission gear rotates reversely to drive the rack to retreat so as to realize reset of the door body, which is convenient to operate.

In addition, the touch switch may also be replaced by an induction switch or a voice operated switch or the like.

In any one of the above technical solutions, preferably, the automatic switching device further comprises a door closer arranged on the connecting portion, wherein the door closer comprises a torsion ring for realizing reset of the rack by rebounding after the rack extends forwards to open the door body.

In the technical solution, by adding the torsion ring on the connection portion to serve as the door closer, in a door opening process, the torsion spring accumulates elastic potential energy through elastic deformation, and in a door closing process, the torsion spring releases elastic potential energy through recovery to the original state to further realize automatic closing of the door body.

An embodiment of the third aspect of the present disclosure provides a refrigeration device comprising the automatic switching device of any one of the first or second aspect of the present disclosure.

The refrigeration device provided by the embodiment of the third aspect of the present disclosure comprises the automatic switching device of any one of the first or second aspect of the present disclosure, and thus has all beneficial effects of the above automatic switching device, which are not be repeated herein.

Additional aspects and advantages of the present disclosure will become apparent in the following description, or are understood by the practice of the present disclosure.

BRIEF DESCRIPTION OF THE SEVERAL VIEWS OF THE DRAWINGS

The above and/or additional aspects and advantages of the present disclosure will become apparent and readily understood from the following descriptions of embodiments in combination with the drawings.

The corresponding relationship between reference signs and component names in FIG. 1 to FIG. 11 is as follows:

10 automatic switching device, 20 cabinet body, 30 door body, 102 ejection structure, 1022 transmission gear, 1024 rack, 104 driving device, 106 auxiliary control device, 1062 inductor, 1064 first induction switch, 1066 second induction switch, 108 box body, 1082 first receiving portion, 1084 second receiving portion, 1082A notch, 110 sliding portion, 1084A chute, 1102 paddle, 112 elastomer, 1042 driving motor, 1044 reduction box, 1 refrigeration device.

DETAILED DESCRIPTION

In order to understand the above objectives, features and advantages of the present disclosure more clearly, the present disclosure will be further described in detail below in combination with drawings. It should be noted that the embodiments of the present application and the features in the embodiments may be combined with each other without conflicts.

In the following description, numerous specific details are set forth in order to provide a full understanding of the present disclosure, but the present disclosure may be practiced otherwise than as described herein. Therefore, the protection scope of the present disclosure is not limited by specific embodiments disclosed below.

The automatic switching device according to some embodiments of the present disclosure are described below with reference to FIG. 1 to FIG. 9.

Figure 3:
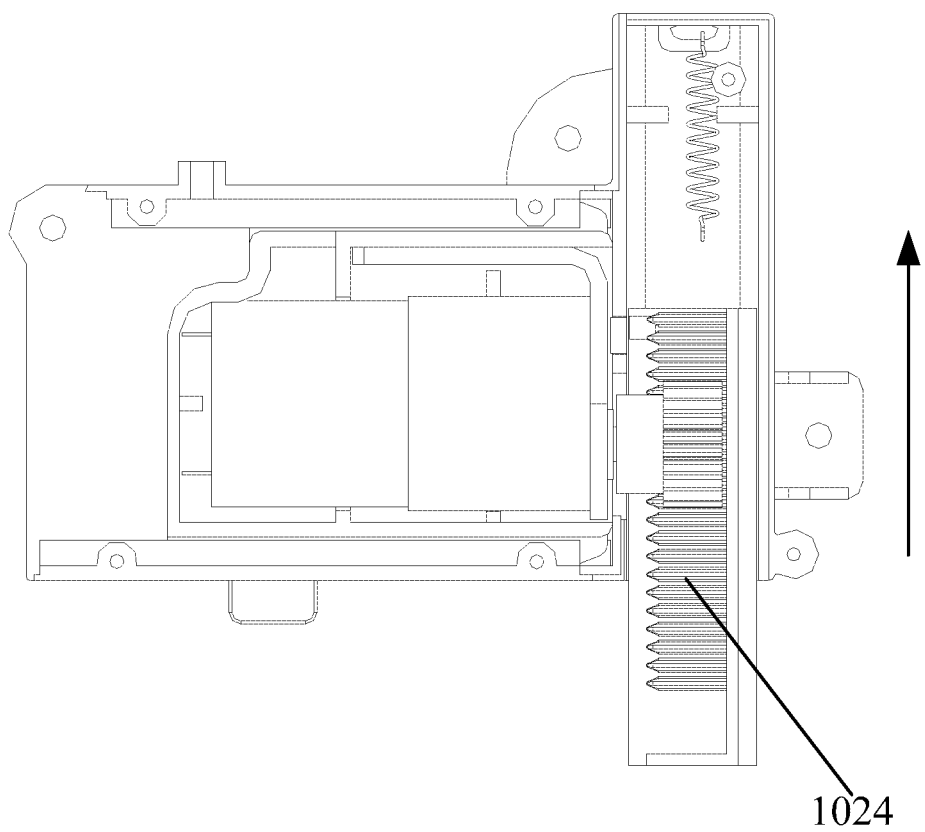
FIG. 3 illustrates a schematic top view of the automatic switching device in FIG. 2.
Figure 4:
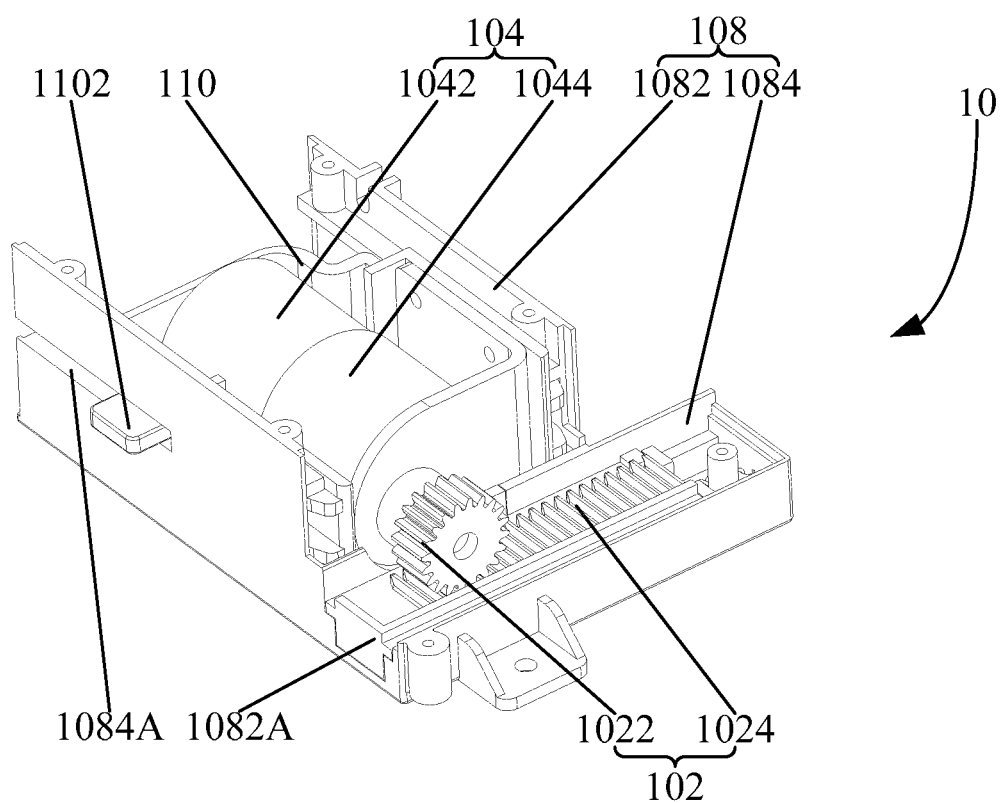
FIG. 4 illustrates a structural schematic diagram of a reset state of the automatic switching device in accordance with one embodiment of the present disclosure.

As shown in FIG. 1 to FIG. 4, an automatic switching device 10 according to a first embodiment of the present disclosure is applicable to a refrigeration device, which comprises a cabinet body 20 and a door body 30 connected with the cabinet body 20, wherein, the automatic switching device 10 is installed on the cabinet body 20; the automatic switching device 10 comprises: an ejection structure 102, comprising a transmission gear 1022 and a rack 1024 matching the transmission gear 1022 in transmission; a driving device 104, connected to the transmission gear 1022 and used for driving the transmission gear 1022 to rotate, so as to drive the rack 1024 to extend forwards to open the door body 30 or retract backwards to close the door body 30; and an auxiliary control device 106 comprising an inductor 1062 arranged on the rack 1024, a first induction switch 1064 and a second induction switch 1066, the first induction switch 1064 and the second induction switch 1066 being connected to the driving device 104 respectively; as shown in FIG. 3, when the inductor 1062 moves to the position of the first induction switch 1064, by generating a first control signal, the first induction switch 1064 controls the driving device 104 to stop working so as to cause the door body 30 to be in an opened state; and as shown in FIG. 4, when the inductor 1062 moves to the position of the second induction switch 1066, by generating a second control signal, the second induction switch 1066 controls the driving device 104 to stop working so as to cause the door body 30 to reset to a closed state.

In the technical solution, the automatic switching device 10 is arranged on the cabinet body 20 of the refrigeration device; the automatic switching device 10 comprises the ejection structure 102, the driving device 104 and the auxiliary control device 106, wherein the ejection structure 102 comprises a straight transmission gear 1022 and a rack 1024 matching the straight transmission gear 1022, the driving device 104 drives the transmission gear 1022 to rotate positively to realize forward movement of the rack 1024 engaged with the transmission gear 1022 and open the door body 30 through ejection, and the driving device 104 drives the transmission gear 1022 to rotate reversely to realize backward movement of the rack 1024 engaged with the transmission gear 1022 so as to cause the door body 30 to reset to be closed.

The inductor 1062 is arranged on the rack 1024, and can move forwards and backwards along with the rack 1024, the first induction switch 1064 and the second induction switch 1066 are respectively arranged at specified positions on the moving path of the rack 1024, and the first induction switch 1064 is closer to the door body 30 than the second induction switch 1066. When the introducer 1062 moves to the position of the first induction switch 1064 along with the rack 1024, by inducing with the first induction switch 1064, the first induction switch 1064 generates the first control signal to control the driving device 104 to stop working; at this time, the rack 1024 extends out to open the door body 30, the door body 30 is in an opened state, and the second induction switch 1066 is activated to work. After a specified period of time, the driving device 104 drives the transmission gear 1022 to rotate reversely, so that the rack 1024 moves in a reverse direction (as shown by the direction of the arrow in FIG. 3) until the inductor 1062 induces with the second induction switch 1066, and the second induction switch 1066 generates the second control signal to control the driving device 104 to stop working so as to cause the door body 30 to reset to be closed.

The stroke of the rack 1024 can be controlled by arranging the induction switches while automatic opening and closing of the door body 30 are realized. When the maximum stroke is reached, that is, when the first induction switch 1064 is triggered to generate an induction signal to keep the door body 30 in the open state for a specified period of time, the door body 30 is automatically closed. On the one hand, after the door body 30 is opened, the door body 30 is automatically in an opened state because the rack 1024 is in the extended state, and no external force is required for keeping the state; and on the other hand, as the transmission gear 1022 adopts standard parts, the production cost is low, the induction switches are arranged to realize the controllable stroke, the driving device 104 is automatically controlled after a specified stroke is completed, and the control precision is high.

The induction switch may be a switch based on electromagnetic induction or a switch based on infrared induction, microwave induction or photoelectric induction.

The automatic switching device 10 may be either individually arranged at the upper or lower end of the cabinet body 20 or respectively arranged at the upper and lower ends of the cabinet body 20.

In addition, the automatic switching device 10 in the above embodiment provided by the present disclosure may also have the following additional technical features.

As shown in FIG. 1 to FIG. 4, in the above technical solution, preferably, the automatic switching device further comprises a box body 108 installed on the cabinet body 20, wherein the box body 108 comprises a first receiving portion 1082 and a second receiving portion 1084; the rack 1024, the first induction switch 1064 and the second induction switch 1066 are installed in the first receiving portion 1082, a sidewall of the first receiving portion 1082 opposite to the door body 30 is provided with a notch 1082A, and the rack 1024 extends out of the notch 1082A to eject the door body 30 out; the driving device 104 is installed in the second receiving portion 1084; and the first induction switch 1064 is closer to the notch 1082A than the second induction switch 1066.

In the above technical solution, the automatic switching device 10 further comprises a box body 108 arranged outside and functioning for containing, wherein specifically, the box body 108 comprises a first receiving portion 1082 and a second receiving portion 1084; the first receiving portion 1082 is used for installing the rack 1024, the first induction switch 1064 and the second induction switch 1066, a sidewall of the first receiving portion 1082 opposite to the door body 30 is provided with the notch 1082A, and the first induction switch 1064 is closer to the notch 1082A than the second induction switch 1066. The rack 1024 extends out of the notch 1082A to eject the door body 30 out to realize automatic opening of the door body 30. The box body 108 is arranged to realize integral modularized assembly of the ejection structure 102, the driving device 104 and the auxiliary control device 106, so that the assembly process is simplified and the disassembly is convenient; and the box body 108 is arranged, which is beneficial to improving the assembly strength of the automatic switching device 10 and prolonging the service life.

Figure 5:
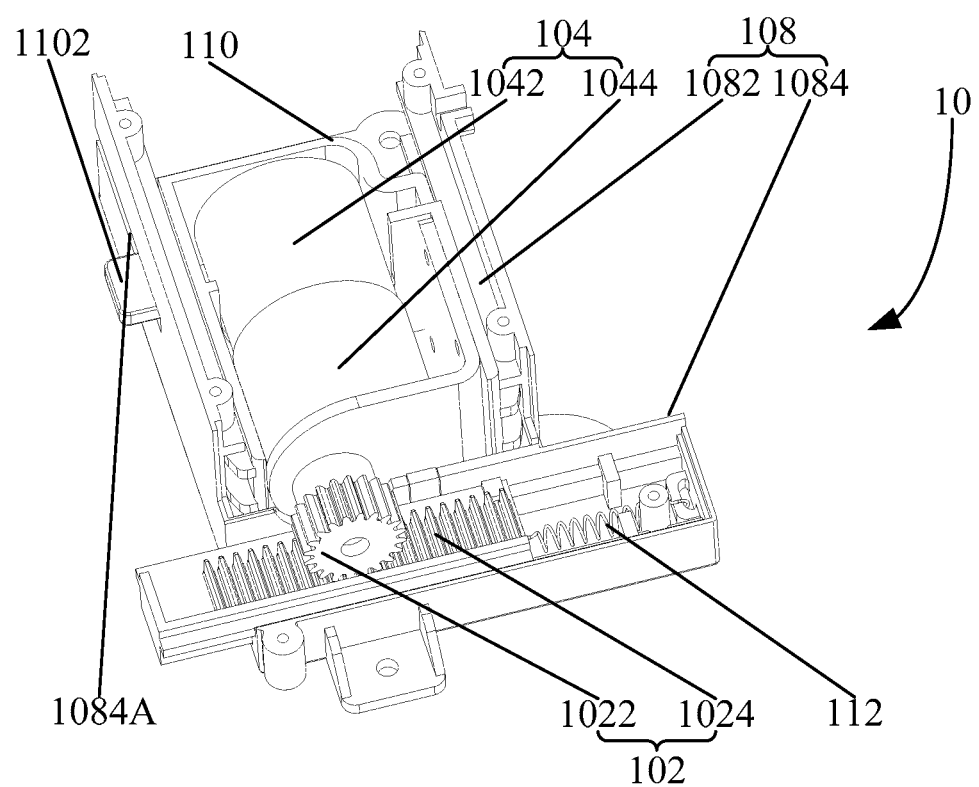
FIG. 5 illustrates a structural schematic diagram of an extended state of the automatic switching device in accordance with one embodiment of the present disclosure.
Figure 6:
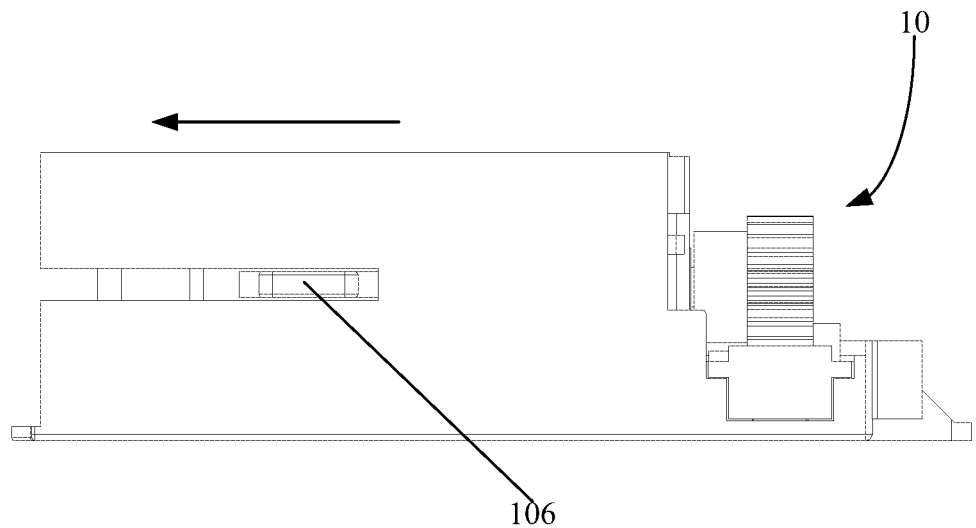
FIG. 6 illustrates a schematic side view of the automatic switching device in FIG. 5.

As shown in FIG. 1 to FIG. 9, in any one of the above technical solutions, preferably, the automatic switching device further comprises a sliding portion 110, arranged in the second receiving portion 1084 and connected to the driving device 104, wherein the side wall of the second receiving portion 1084 opposite to the door body 30 is provided with a chute 1084A; a paddle 1102 is arranged at a position where the sliding portion 110 matches the chute 1084A, as shown in FIG. 6, the paddle 1102 extends to the outside of the second receiving portion 1084 by the chute 1084A, and the paddle 1102 drives the transmission gear 1022 to disengage from the rack 1024 when being subjected to an external force.

In the technical solution, by arranging the sliding portion 110 in the second receiving portion 1084 and connecting the sliding portion 110 to the driving device 104, the driving device 104 moves forwards and backwards when the sliding portion 110 slides forwards and backwards. Moreover, the chute 1084A is arranged on the side wall of the second receiving portion 1084 opposite to the door body 30, the paddle 1102 capable of moving along the chute 1084A is arranged at a position where the sliding portion 110 matches the chute 1084A. When the automatic door opening function or automatic door closing function of the automatic switching device 10 is abnormal, the paddle 1102 is stirred manually to drive the driving device 104 to retreat until the transmission gear 1022 disengages from the rack 1024, and then the rack 1024 is reset to realize manual closing of the door body 30, thereby preventing the condition that the door body 30 cannot be closed when an abnormal condition occurs.

As shown in FIG. 5 and FIG. 6, specifically, when an abnormal condition (such as fault of the driving device 104, power off, etc.) occurs to the ejection structure 102, the rack 1024 and the transmission gear 1022 stop urgently in a moving state, and if the rack 1024 has extended a certain length at this moment, the door body 30 cannot be normally closed. As the paddle 1102, the sliding portion 110, and the driving device 104 can be regarded as a whole, as shown by the direction of the arrow in FIG. 6, by stirring the paddle 1102, the paddle 1102 slides along the chute 1084A until the driving device 104 drives the transmission gear 1022 to disengage from the rack 1024, the rack 1024 is manually reset, and then the corresponding door body 30 can be manually closed.

In any one of the above technical solutions, preferably, the area on the cabinet body 20 away from the connection portion of the cabinet body 20 and the door body 30 is provided with a containing groove (not shown), and the box body 108 is arranged in the containing groove.

In the technical solution, the containing groove is arranged on the cabinet body 20 to install the box body 108. On the one hand, the overall good appearance of the refrigeration device can be prevented from being affected by the automatic switching device 10, and on the other hand, the containing groove is formed at a position away from the connection portion (such as a hinge, etc.) of the cabinet body 20 and the door body 30, so that the ejection operation is easier.

In any one of the above technical solutions, preferably, the area of the rack 1024 opposite to the notch 1082A is provided with an elastic portion (not shown).

In the technical solution, by arranging the elastic portion in the area of the rack 1024 opposite to the notch 1082A, when the rack 1024 abuts against the door body 30, the elastic portion generates elastic deformation, so that soft contact between the rack 1024 and the door body 30 is achieved to prevent generation of a dent when the rack 1024 abuts against the door body 30.

Moreover, the elastic portion may also be arranged in an area opposite to the door body 30.

Specifically, the elastic portion is a rubber fitting.

Figure 7:
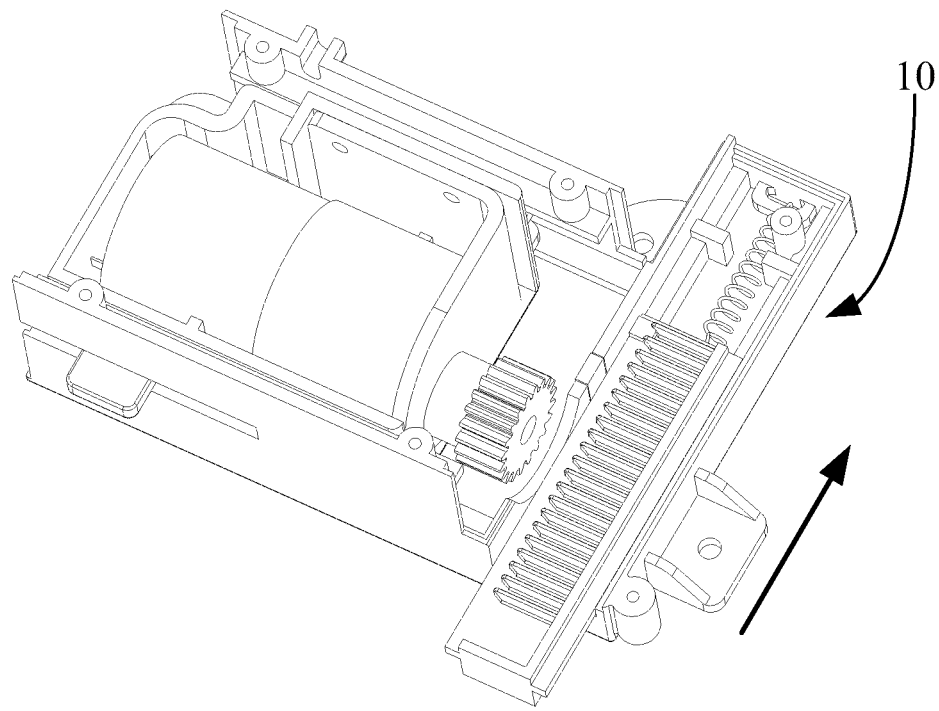
FIG. 7 illustrates a structural schematic diagram after retraction of the transmission gear in the automatic switching device in FIG. 6.
Figure 8:
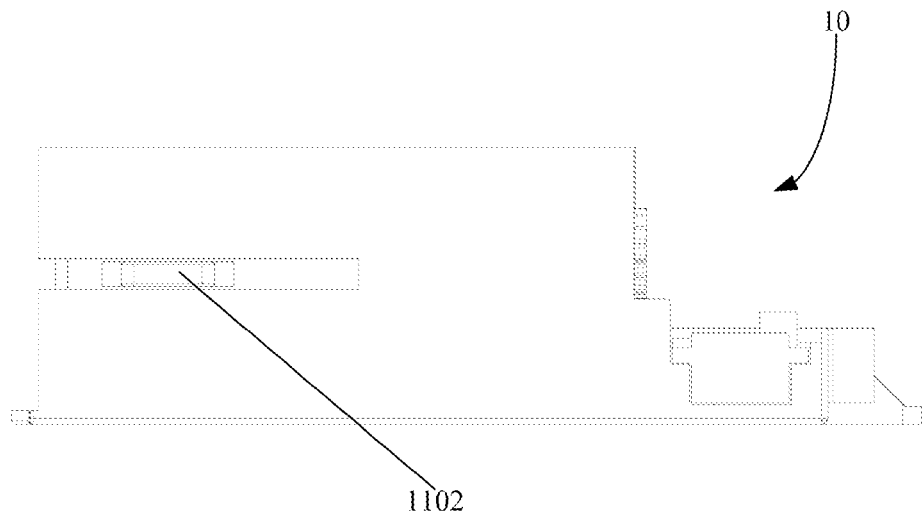
FIG. 8 illustrates a schematic side view of the automatic switching device in FIG. 7.
Figure 9:
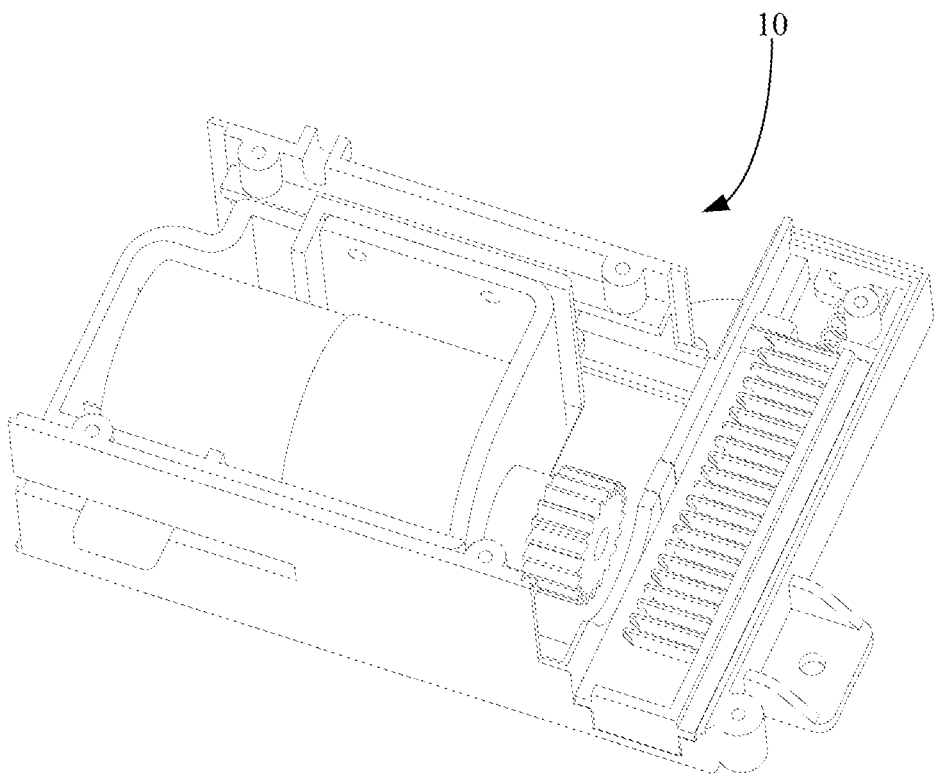
FIG. 9 illustrates a structural schematic diagram after reset of the rack in the automatic switching device in FIG. 7.

As shown in FIG. 5, FIG. 7 and FIG. 9, in any one of the above technical solutions, the automatic switching device further comprises an elastomer 112, of which one end is connected to the first receiving portion 1082 and the other end is connected to the rack 1024, wherein the elastomer 112 is used for pulling the rack 1024 back to reset after the transmission gear 1022 disengages from the rack 1024.

In the technical solution, by arranging the elastomer 112 in the first receiving portion 1082, connecting one end of the elastomer 112 to the first receiving portion 1082 and connecting the other end of the elastomer 112 to the rack 1024, the elastomer 112 is in a tension state when the rack 1024 moves towards the direction of the door body 30, and in the case that the door body 30 needs to be closed manually when the automatic switching device 10 is abnormal, the rack 1024 is pulled back to reset through resilience of the elastomer 112, thus simplifying operation of users.

Specifically, the elastomer is a spring.

As shown in FIG. 1 to FIG. 4, in any one of the above technical solutions, preferably, the driving device 104 comprises a driving motor 1042, a reduction box 1044 connected to the driving motor 1042, wherein the free end of the reduction box 1044 is provided with a rotating shaft, and the driving device 104 is connected to the transmission gear 1022 through the rotating shaft to drive the transmission gear 1022 to rotate.

In the technical solution, the driving device 104 comprises a driving motor 1042 and a reduction box 1044, and the free end of the reduction box 1044 is provided with a rotating shaft matching the transmission gear 1022. The rotating shaft drives the transmission gear 1022 to rotate through matching of the driving motor 1042 and the reduction box 1044 to drive the rack 1024 to move, thereby being capable of reducing the rotating speed, preventing intense wear and noise between the transmission gear 1022 and the rack 1024 resulted from too fast rotation of the transmission gear 1022, and improving the service lives of the transmission gear 1022 and the rack 1024.

Figure 1:
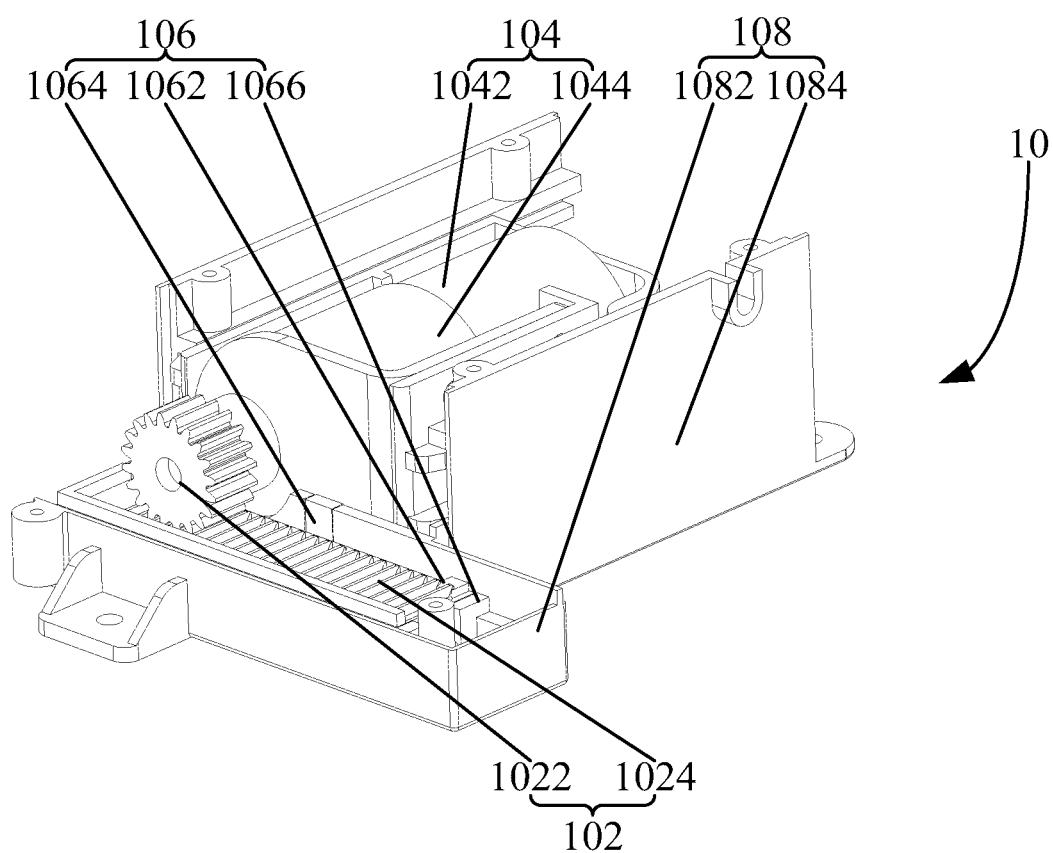
FIG. 1 illustrates a structural schematic diagram of an initial state of an automatic switching device in accordance with one embodiment of the present disclosure.
Figure 2:
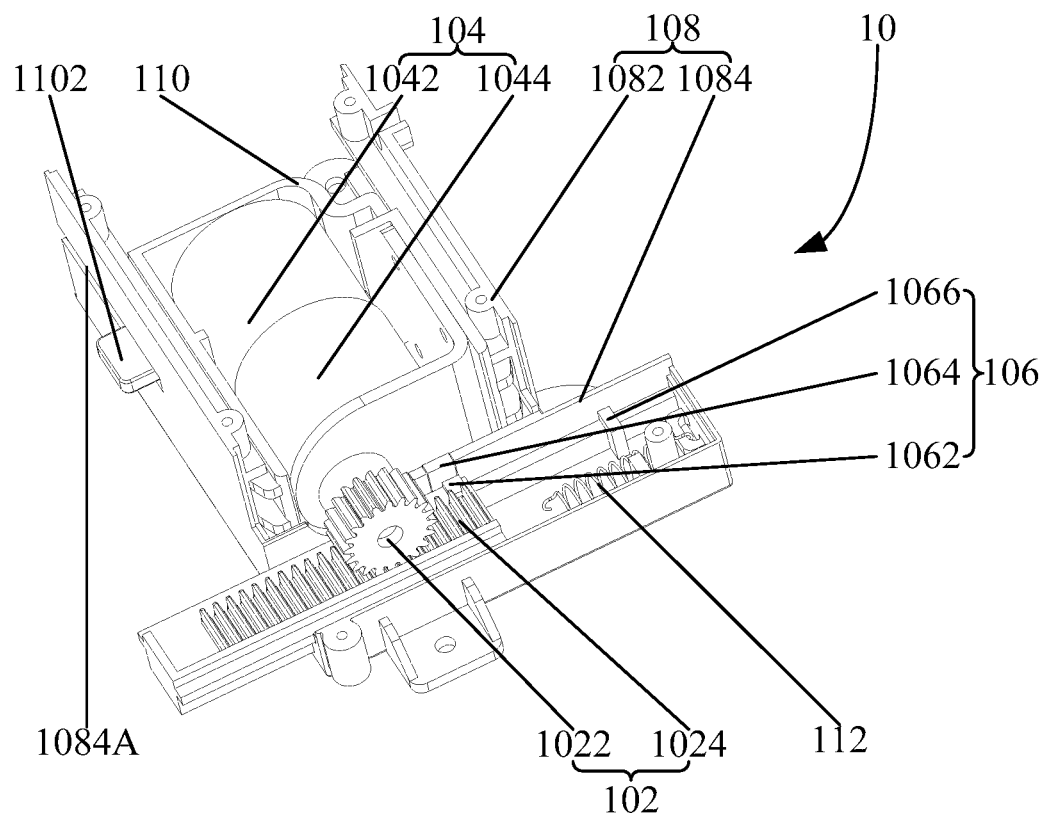
FIG. 2 illustrates a structural schematic diagram of an extended state of the automatic switching device in accordance with one embodiment of the present disclosure.

As shown in FIG. 1, in any one of the above technical solutions, preferably, the inductor 1062 is a magnet, the first induction switch 1064 is a first Hall switch, and the second induction switch 1066 is a second Hall switch, wherein when the magnet and the first Hall switch send electromagnetic induction, the first Hall switch generates the first control signal, and when the magnet and the second Hall switch send electromagnetic induction, the second Hall switch generates the second control signal.

In the technical solution, by arranging the inductor 1062 as a magnet and arranging both the first induction switch 1064 and the second induction switch 1066 as Hall switches, when the magnetic field of the magnet on the rack 1024 is induced by the first Hall switch, the first Hall switch outputs the first control signal to a control circuit, and the control circuit cuts off the power of the driving motor 1042 according to the received first control signal to realize ejection and hovering of the rack 1024 to open the door body 30 through ejection.

After a predetermined period of time, by inputting a reverse current to the driving motor 1042, the driving motor 1042 drives the transmission gear 1022 to rotate reversely, the transmission gear 1022 drives the rack 1024 to move in an opposite direction until the magnet on the rack 1024 is induced by the second Hall switch, the second Hall switch outputs the second control signal to the control circuit, and the control circuit cuts off the power of the driving motor 1042 to reset the entire device.

An electromagnetic induction method is adopted to realize a controllable stroke. Compared with infrared induction, photoelectric induction and other methods, the electromagnetic induction method is low in cost, high in reliability, and easy to apply.

In any one of the above technical solutions, preferably, the automatic switching device further comprises a touch switch (not shown) arranged on a handle area of the door body 30, wherein the touch switch is connected to the driving device 104.

In the technical solution, by arranging the touch switch on the handle of the door body 30 and connecting the touch switch to the driving device 104, when the user needs to open the door, by touching the touch switch, the driving device 104 starts operation to drive the transmission gear 1022 to rotate so as to drive the rack 1024 to eject the door body 30 out. When arriving at the area of the first Hall switch, the magnet sends the first control signal by generating electromagnetic induction with the first Hall switch; at this time, the driving device 104 stops working, and after a specified period of time or through touching the touch switch again by the user, the transmission gear 1022 rotates reversely to drive the rack 1024 to retreat so as to realize reset of the door body 30, which is convenient to operate.

In addition, the touch switch may also be replaced by an induction switch or a voice operated switch or the like.

In any one of the above technical solutions, preferably, the automatic switching device further comprises a door closer (not shown) arranged on the connecting portion, wherein the door closer comprises a torsion ring for realizing reset of the rack 1024 by rebounding after the rack 1024 extends forwards to open the door body 30.

In the technical solution, by adding the torsion ring on the connection portion to serve as the door closer, in a door opening process, the torsion spring accumulates elastic potential energy through elastic deformation, and in a door closing process, the torsion spring releases elastic potential energy through recovery to the original state to further realize automatic closing of the door body 30.

As shown in FIG. 1 to FIG. 4, an automatic switching device 10 according to a second embodiment of the present disclosure is applicable to a refrigeration device, which comprises a cabinet body 20 and a door body 30 in connection with the cabinet body 20, wherein, the automatic switching device 10 is installed on the door body 30; the automatic switching device 10 comprises: an ejection structure 102, comprising a transmission gear 1022 and a rack 1024 matching the transmission gear 1022 in transmission; a driving device 104, connected to the transmission gear 1022 and used for driving the transmission gear 1022 to rotate, so as to drive the rack 1024 to extend forwards to open the door body 30 or retract backwards to close the door body 30; and an auxiliary control device 106 comprising an inductor 1062 arranged on the rack 1024, a first induction switch 1064 and a second induction switch 1066, the first induction switch 1064 and the second induction switch 1066 being connected to the driving device 104 respectively; as shown in FIG. 4, when the inductor 1062 moves to the position of the first induction switch 1064, by generating a first control signal, the first induction switch 1064 controls the driving device 104 to stop working so as to cause the door body 30 to be in an opened state; and as shown in FIG. 4, when the inductor 1062 moves to the position of the second induction switch 1066, by generating a second control signal, the second induction switch 1066 controls the driving device 104 to stop working so as to cause the door body 30 to reset to a closed state.

In the technical solution, the automatic switching device 10 is arranged on the door body 30 of the refrigeration device; the automatic switching device 10 comprises the ejection structure 102, the driving device 104 and the auxiliary control device 106, wherein the ejection structure 102 comprises a straight transmission gear 1022 and a rack 1024 matching the straight transmission gear 1022, the driving device 104 drives the transmission gear 1022 to rotate positively to realize forward movement of the rack 1024 engaged with the transmission gear 1022 and open the door body 30 through ejection by abutting against the cabinet body 20, and the driving device 104 drives the transmission gear 1022 to rotate reversely to realize backward movement of the rack 1024 engaged with the transmission gear 1022 so as to cause the door body 30 to reset to be closed.

The inductor 1062 is arranged on the rack 1024, and can move forwards and backwards along with the rack 1024, the first induction switch 1064 and the second induction switch 1066 are respectively arranged at specified positions on the moving path of the rack 1024, and the first induction switch 1064 is closer to the cabinet body 20 than the second induction switch 1066. When the introducer 1062 moves to the position of the first induction switch 1064 along with the rack 1024, by inducing with the first induction switch 1064, the first induction switch 1064 generates the first control signal to control the driving device 104 to stop working; at this time, the rack 1024 extends out to open the door body 30, the door body 30 is in an opened state, and the second induction switch 1066 is activated to work. After a specified period of time, the driving device 104 drives the transmission gear 1022 to rotate reversely, so that the rack 1024 moves in a reverse direction (as shown by the direction of the arrow in FIG. 3) until the inductor 1062 induces with the second induction switch 1066, and the second induction switch 1066 generates the second control signal to control the driving device 104 to stop working so as to cause the door body 30 to reset to be closed.

The stroke of the rack 1024 can be controlled by arranging the induction switches while automatic opening and closing of the door body 30 are realized. When the maximum stroke is reached, that is, when the first induction switch 1064 is triggered to generate an induction signal to keep the door body 30 in the open state for a specified period of time, the door body 30 is automatically closed. On the one hand, after the door body 30 is opened, the door body 30 is automatically in an opened state because the rack 1024 is in the extended state, and no external force is required for keeping the state; and on the other hand, as the transmission gear 1022 adopts standard parts, the production cost is low, the induction switches are arranged to realize the controllable stroke, the driving device 104 is automatically controlled to stop working after a specified stroke is completed, and the control precision is high.

The induction switch may be a switch based on electromagnetic induction or a switch based on infrared induction, microwave induction or photoelectric induction.

The automatic switching device 10 may be either individually arranged at the upper or lower end of the cabinet body 20 or respectively arranged at the upper and lower ends of the cabinet body 20.

As shown in FIG. 1 to FIG. 4, in any one of the above technical solutions, preferably, the automatic switching device further comprises a box body 108 installed on the door body 30, wherein the box body 108 comprises a first receiving portion 1082 and a second receiving portion 1084; the rack 1024, the first induction switch 1064 and the second induction switch 1066 are installed in the first receiving portion 1082, a sidewall of the first receiving portion 1082 opposite to the cabinet body 20 is provided with a notch 1082A, and the rack 1024 extends out of the notch 1082A to eject the door body 30 out; the driving device 104 is installed in the second receiving portion 1084; and the first induction switch 1064 is closer to the notch 1082A than the second induction switch 1066.

In the above technical solution, the automatic switching device 10 further comprises a box body 108 arranged outside and functioning for containing, wherein specifically, the box body 108 comprises a first receiving portion 1082 and a second receiving portion 1084; the first receiving portion 1082 is used for installing the rack 1024, the first induction switch 1064 and the second induction switch 1066, a sidewall of the first receiving portion 1082 opposite to the door body 30 is provided with a notch 1082A, and the first induction switch 1064 is closer to the notch 1082A than the second induction switch 1066. The rack 1024 extends out of the notch 1082A to eject the door body 30 out to realize automatic opening of the door body 30. The box body 108 is arranged to realize integral modularized assembly of the ejection structure 102, the driving device 104 and the auxiliary control device 106, so that the assembly process is simplified and the disassembly is convenient; and the box body 108 is arranged, which is beneficial to improving the assembly strength of the automatic switching device 10 and prolonging the service life.

As shown in FIG. 1 to FIG. 9, in any one of the above technical solutions, preferably, the automatic switching device further comprises a sliding portion 110, arranged in the second receiving portion 1084 and connected to the driving device 104, wherein the side wall of the second receiving portion 1084 opposite to the cabinet body 20 is provided with a chute 1084A; a paddle 1102 is arranged at a position where the sliding portion 110 matches the chute 1084A, as shown in FIG. 6, the paddle 1102 extends to the outside of the second receiving portion 1084 by the chute 1084A, and the paddle 1102 drives the transmission gear 1022 to disengage from the rack 1024 when being subjected to an external force.

In the technical solution, by arranging the sliding portion 110 in the second receiving portion 1084 and connecting the sliding portion 110 to the driving device 104, when sliding forwards and backwards, the sliding portion 110 drives the driving device 104 to move forwards and backwards. Moreover, the chute 1084A is arranged on the side wall of the second receiving portion 1084 opposite to the cabinet body 20, the paddle 1102 capable of moving along the chute 1084A is arranged at a position where the sliding portion 110 matches the chute 1084A. When the automatic door opening function or automatic door closing function of the automatic switching device 10 is abnormal, the paddle 1102 is stirred manually to drive the driving device 104 to retreat until the transmission gear 1022 disengages from the rack 1024, and then the rack 1024 is reset to realize manual closing of the door body 30, thereby preventing the condition that the door body 30 cannot be closed when an abnormal condition occurs.

As shown in FIG. 5 and FIG. 6, specifically, when an abnormal condition (such as fault of the driving device 104, power off, etc.) occurs to the ejection structure 102, the rack 1024 and the transmission gear 1022 stop urgently in a moving state, and if the rack 1024 has extended a certain length at this moment, the door body 30 cannot be normally closed. As the paddle 1102, the sliding portion 110, and the driving device 104 can be regarded as a whole, as shown by the direction of the arrow in FIG. 6, by stirring the paddle 1102, the paddle 1102 slides along the chute 1084A until the driving device 104 drives the transmission gear 1022 to disengage from the rack 1024, the rack 1024 is manually reset, and then the corresponding door body 30 can be manually closed.

In any one of the above technical solutions, preferably, the area on the door body 30 away from the connection portion of the cabinet body 20 and the door body 30 is provided with a containing groove (not shown), and the box body 108 is arranged in the containing groove.

In the technical solution, the containing groove is arranged on the door body 30 to install the box body 108. On the one hand, the overall good appearance of the refrigeration device can be prevented from being affected by the automatic switching device 10, and on the other hand, the containing groove is formed at a position away from the connection portion (such as a hinge, etc.) of the cabinet body 20 and the door body 30, so that the ejection operation is easier.

In any one of the above technical solutions, preferably, the area of the rack 1024 opposite to the notch 1082A is provided with an elastic portion (not shown).

In the technical solution, by arranging the elastic portion in the area of the rack 1024 opposite to the notch 1082A, when the rack 1024 abuts against the cabinet body 20, the elastic portion generates elastic deformation, so that soft contact between the rack 1024 and the cabinet body 20 is achieved to prevent generation of a dent when the rack 1024 abuts against the cabinet body 20.

Moreover, the elastic portion may also be arranged in an area opposite to the cabinet body 20.

Specifically, the elastic portion is a rubber fitting.

As shown in FIG. 5, FIG. 7 and FIG. 9, in any one of the above technical solutions, the automatic switching device further comprises an elastomer 112, of which one end is connected to the first receiving portion 1082 and the other end is connected to the rack 1024, wherein the elastomer 112 is used for pulling the rack 1024 back to reset after the transmission gear 1022 disengages from the rack 1024.

In the technical solution, by arranging the elastomer 112 in the first receiving portion 1082, connecting one end of the elastomer 112 to the first receiving portion 1082 and connecting the other end of the elastomer to the rack 1024, the elastomer 112 is in a tension state when the rack 1024 moves towards the direction of the door body 30, and in the case that the door body 30 needs to be closed manually when the automatic switching device 10 is abnormal, the rack 1024 is pulled back to reset through resilience of the elastomer 112, thus simplifying operation of users.

Specifically, the elastomer 112 is a spring.

As shown in FIG. 1 to FIG. 4, in any one of the above technical solutions, preferably, the driving device 104 comprises a driving motor 1042, a reduction box 1044 connected to the driving motor 1042, wherein the free end of the reduction box 1044 is provided with a rotating shaft, and the driving device 104 is connected to the transmission gear 1022 through the rotating shaft to drive the transmission gear 1022 to rotate.

In the technical solution, the driving device 104 comprises a driving motor 1042 and a reduction box 1044, and the free end of the reduction box 1044 is provided with a rotating shaft matching the transmission gear 1022. The rotating shaft drives the transmission gear 1022 to rotate through matching of the driving motor 1042 and the reduction box 1044 to drive the rack 1024 to move, thereby being capable of reducing the rotating speed, preventing intense wear and noise between the transmission gear 1022 and the rack 1024 resulted from too fast rotation of the transmission gear 1022, and improving the service lives of the transmission gear 1022 and the rack 1024.

As shown in FIG. 1, in any one of the above technical solutions, preferably, the inductor 1062 is a magnet, the first induction switch 1064 is a first Hall switch, and the second induction switch 1066 is a second Hall switch, wherein when the magnet and the first Hall switch send electromagnetic induction, the first Hall switch generates the first control signal, and when the magnet and the second Hall switch send electromagnetic induction, the second Hall switch generates the second control signal.

In the technical solution, by arranging the inductor 1062 as a magnet and arranging both the first induction switch 1064 and the second induction switch 1066 as Hall switches, when the magnetic field of the magnet on the rack 1024 is induced by the first Hall switch, the first Hall switch outputs the first control signal to a control circuit, and the control circuit cuts off the power of the driving motor 1042 according to the received first control signal to realize ejection and hovering of the rack 1024 to open the door body 30 through ejection.

After a predetermined period of time, by inputting a reverse current to the driving motor 1042, the driving motor 1042 drives the transmission gear 1022 to rotate reversely, the transmission gear 1022 drives the rack 1024 to move in an opposite direction until the magnet on the rack 1024 is induced by the second Hall switch, the second Hall switch outputs the second control signal to the control circuit, and the control circuit cuts off the power of the driving motor 1042 to reset the entire device.

An electromagnetic induction method is adopted to realize a controllable stroke. Compared with infrared induction, photoelectric induction and other methods, the electromagnetic induction method is low in cost, high in reliability, and easy to apply.

In any one of the above technical solutions, preferably, the automatic switching device further comprises a touch switch (not shown) arranged on a handle area of the door body 30, wherein the touch switch is connected to the driving device 104.

In the technical solution, by arranging the touch switch on the handle of the door body 30 and connecting the touch switch to the driving device 104, when the user needs to open the door, by touching the touch switch, the driving device 104 starts operation to drive the transmission gear 1022 to rotate so as to drive the rack 1024 to eject the door body 30 out. When arriving at the area of the first Hall switch, the magnet sends the first control signal by generating electromagnetic induction with the first Hall switch; at this time, the driving device 104 stops working, and after a specified period of time or through touching the touch switch again by the user, the transmission gear 1022 rotates reversely to drive the rack 1024 to retreat so as to realize reset of the door body 30, which is convenient to operate.

In addition, the touch switch may also be replaced by an induction switch or a voice operated switch or the like.

In any one of the above technical solutions, preferably, the automatic switching device further comprises a door closer (not shown) arranged on the connecting portion, wherein the door closer comprises a torsion ring for realizing reset of the rack 1024 by rebounding after the rack 1024 extends forwards to open the door body 30.

In the technical solution, by adding the torsion ring on the connection portion to serve as the door closer, in a door opening process, the torsion spring accumulates elastic potential energy through elastic deformation, and in a door closing process, the torsion spring releases elastic potential energy through recovery to the original state to further realize automatic closing of the door body 30.

Figure 10:
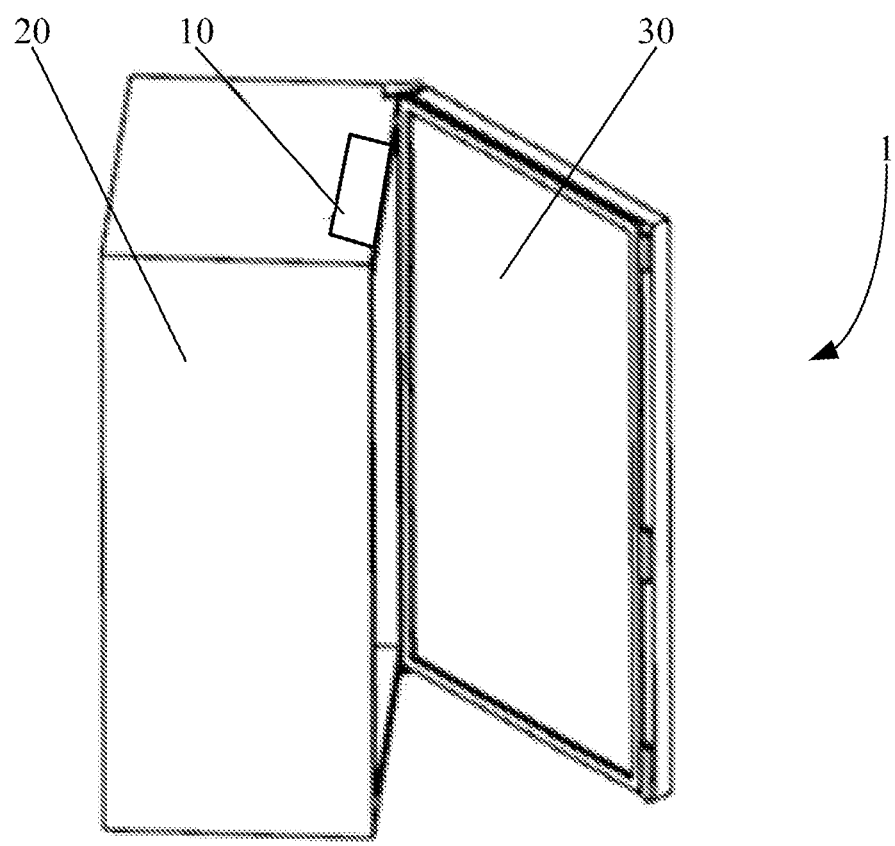
FIG. 10 illustrates a structural schematic diagram of a refrigeration device in accordance with one embodiment of the present disclosure.
Figure 11:
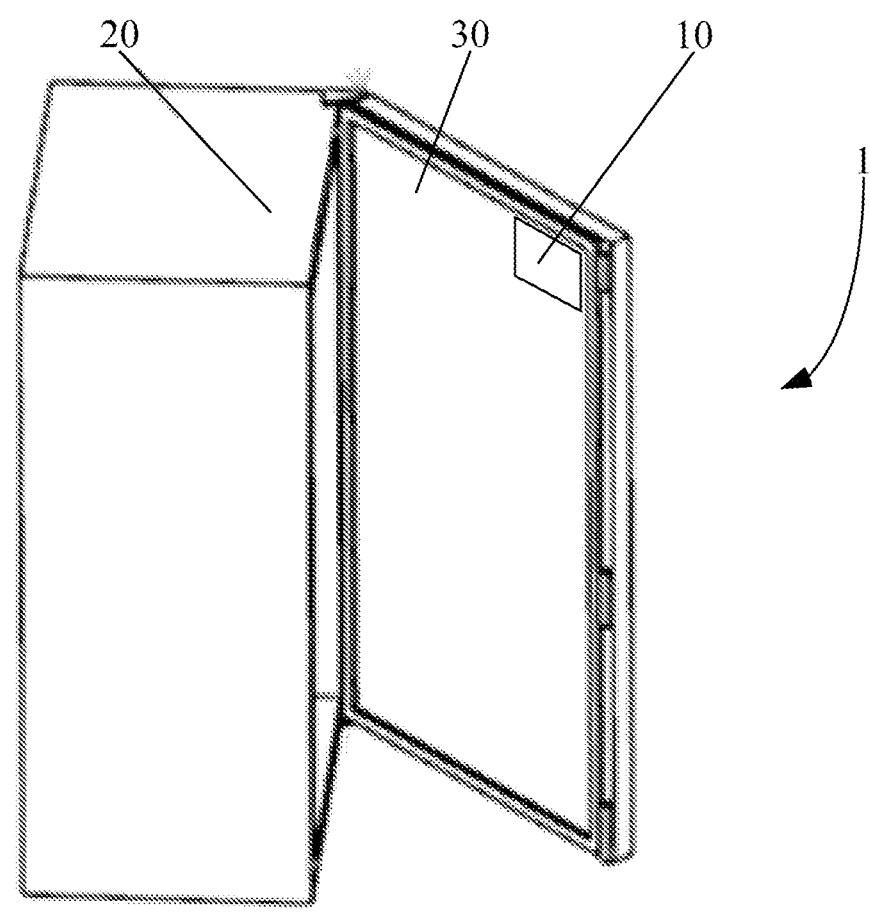
FIG. 11 illustrates a structural schematic diagram of a refrigeration device in accordance with another embodiment of the present disclosure.

FIG. 10 and FIG. 11 illustrates a refrigeration device in accordance with some embodiments of the present disclosure.

As shown in FIG. 10 and FIG. 11, an embodiment of the third aspect of the present disclosure provides a refrigeration device 1 comprising the automatic switching device 10 of any one of the first or second aspect of the present disclosure.

The refrigeration device 1 provided by the embodiment of the second aspect of the present disclosure comprises the automatic switching device 10 of any one of the first or second aspect of the present disclosure, and thus has all beneficial effects of the above automatic switching device 10, which are not be repeated herein.

In the present disclosure, the terms "first", "second", and "third" are used for the purpose of description only, and cannot be construed as indicating or implying the relative importance; the term "plurality" means two or more, unless otherwise explicitly defined. The terms "installation", "connected", "connection", "fixed" and the like should be understood broadly. For example, "connection" may be a fixed connection, and may also be detachable connection or an integral connection; and "connected" may be either directly connected or connected through an intermediary. For the person skilled in the art, the specific meanings of the above terms in the present disclosure may be understood in accordance with specific conditions.

In the description of the present disclosure, it should be understood that the orientation or positional relationships indicated by the terms "upper", "lower", "left", "right", "front", "back" and the like based on the orientation or positional relationships shown in the drawings, are merely for the convenience of the description of the present disclosure rather than indicating or implying that the devices or units referred to may have specific orientations, are constructed and operated in the specific orientations, and thus cannot be construed as limitations to the present disclosure.

In the description of the present specification, the description of the terms "one embodiment", "some embodiments", "specific embodiments" and the like means that the specific features, structures, materials or characteristics described in combination with the embodiments or examples are comprised in at least one embodiment or example of the present embodiment. In the present specification, the schematic representation of the above terms does not necessarily refer to the same embodiment or example. In addition, the specific features, structures, materials or characteristics described may be combined in an appropriate way in any one or more embodiments or examples.

The above descriptions are only preferred embodiments of the present disclosure, and are not intended to limit the present disclosure. Various modifications and variations may be made to the present disclosure for the person skilled in the art. Any modifications, equivalent substitutions, improvements and the like made within the spirit and principle of the present disclosure should be encompassed within the protection scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A refrigeration device, comprising:
a cabinet body;
a door body connected to the cabinet body; and
an automatic switching system positioned on the cabinet body, and the automatic switching system including:
an ejection structure including a transmission gear and a rack matching the transmission gear in transmission;
a driving device, connected to the transmission gear and configured to drive the transmission gear to rotate, so as to drive the rack to protrude to open the door body or to retract to close the door body; and
an auxiliary control device including an inductor, a first induction switch and a second induction switch, the inductor being arranged on the rack, the first induction switch and the second induction switch being connected to the driving device respectively;
wherein, in operation, if the inductor moves to a position adjacent to the first induction switch, the first induction switch generates a first control signal configured to control the driving device to stop driving so as to cause the door body to remain in an opened state; and if the inductor moves to a position adjacent to the second induction switch, the second induction switch generates a second control signal configured to control the driving device to stop driving so as to cause the door body to reset to a closed state,
the automatic switching system further including:
a box body installed on the cabinet body, the box body including a first receiving portion and a second receiving portion;
wherein when installed on the cabinet body:
the rack, the first induction switch and the second induction switch are positioned in the first receiving portion, a sidewall of the first receiving portion opposite to the door body includes a notch, and the rack extends through the notch to eject the door body;
the driving device is positioned in the second receiving portion; and
the first induction switch is closer to the notch than the second induction switch.

2. The refrigeration device of claim 1, further comprising:
a sliding portion arranged in the second receiving portion and connected to the driving device;
a chute positioned on a side wall of the second receiving portion opposite to the door body; and
a paddle arranged at a position where the sliding portion matches the chute, the paddle extending out of the second receiving portion through the chute,
wherein the paddle drives the transmission gear to disengage from the rack if the paddle is subjected to an external force.

3. The refrigeration device of claim 2, wherein, the box body is configured to be positioned in a containing groove on the cabinet body, the containing groove being distal from a connection portion between the cabinet body and the door body.

4. A refrigeration device, comprising:
a cabinet body;
a door body connected to the cabinet body; and
an automatic switching system positioned on the door body, and the automatic switching system including:
an ejection structure including a transmission gear and a rack matching the transmission gear in transmission;
a driving device, connected to the transmission gear and configured to drive the transmission gear to rotate, so as to drive the rack to protrude or retract; and
an auxiliary control device including an inductor, a first induction switch and a second induction switch, the inductor being arranged on the rack, the first induction switch and the second induction switch being connected to the driving device respectively;
wherein, in operation, if the inductor moves to a position adjacent to the first induction switch, the first induction switch generates a first control signal configured to control the driving device to stop driving so as to cause the door body to remain in an opened state; and if the inductor moves to a position adjacent to the second induction switch, the second induction switch generates a second control signal configured to control the driving device to stop driving so as to cause the door body to reset to a closed state,
the automatic switching system further including:
a touch switch arranged on a handle area of the door body, and connected to the driving device.

5. The refrigeration device of claim 4, further comprising:
a box body installed on the door body, the box body including a first receiving portion and a second receiving portion;
wherein when installed on the cabinet body:
the rack, the first induction switch and the second induction switch are positioned in the first receiving portion, a sidewall of the first receiving portion opposite to the cabinet body includes a notch, and the rack extends through the notch to eject the door body;
the driving device is positioned in the second receiving portion; and
the first induction switch is closer to the notch than the second induction switch.

6. The refrigeration device of claim 5, further comprising:
a sliding portion arranged in the second receiving portion and connected to the driving device,
a chute positioned on a side wall of the second receiving portion opposite to the cabinet body; and
a paddle arranged at a position where the sliding portion matches the chute, the paddle extending out of the second receiving portion through the chute,
wherein the paddle drives the transmission gear to disengage from the rack if the paddle is subjected to an external force.

7. The refrigeration device of claim 6, wherein, the box body is positioned in a containing groove on the door body, the containing groove being distal from a connection portion between the cabinet body and the door body.

8. The refrigeration device of claim 7, further comprising:
a door closer arranged on the connecting portion, the door closer including a torsion ring for realizing reset of the rack by rebounding after the rack protrudes to open the door body.

9. The refrigeration device of claim 5, wherein, an area of the rack opposite to the notch includes an elastic portion.

10. The refrigeration device of claim 6, further comprising:
an elastomer, a first end of the elastomer being connected to the first receiving portion, and a second end of the elastomer being connected to the rack,
wherein the elastomer is configured to pull the rack back to reset after the transmission gear disengages from the rack.

11. The refrigeration device of claim 4, wherein:
the driving device includes a driving motor and a reduction gearbox connected to the driving motor;
a free end of the reduction gearbox includes a rotating shaft; and
the driving device is connected to the transmission gear through the rotating shaft to drive the transmission gear to rotate.

12. A refrigeration device, comprising:
a cabinet body;
a door body connected to the cabinet body; and
an automatic switching system positioned on the door body, and the automatic switching system including:
an ejection structure including a transmission gear and a rack matching the transmission gear in transmission;
a driving device, connected to the transmission gear and configured to drive the transmission gear to rotate, so as to drive the rack to protrude or retract; and
an auxiliary control device including an inductor, a first induction switch and a second induction switch, the inductor being arranged on the rack, the first induction switch and the second induction switch being connected to the driving device respectively;
wherein, in operation, if the inductor moves to a position adjacent to the first induction switch, the first induction switch generates a first control signal configured to control the driving device to stop driving so as to cause the door body to remain in an opened state; and if the inductor moves to a position adjacent to the second induction switch, the second induction switch generates a second control signal configured to control the driving device to stop driving so as to cause the door body to reset to a closed state,
wherein,
the inductor is a magnet, the first induction switch is a first Hall switch, and the second induction switch is a second Hall switch, and
wherein if an electromagnetic induction is formed between the magnet and the first Hall switch, the first Hall switch generates the first control signal, and
wherein if an electromagnetic induction is formed between the magnet and the second Hall switch, the second Hall switch generates the second control signal.

13. An automatic switching system configured to be installed on one of a cabinet body or a door body of a refrigeration device, the automatic switching system including:
an ejection mechanism, including a gear and a rack matching the gear;
a driving mechanism connected to drive the gear to rotate, so as to drive the rack to protrude to open the door body or to retract to close the door body; and
an auxiliary control mechanism including an inductor on the rack, a first induction switch and a second induction switch, the first induction switch and the second induction switch being communicatively connected to the driving mechanism;
wherein, in operation, if the inductor moves with the rack to a position adjacent to the first induction switch, the first induction switch generates a first control signal configured to control the driving mechanism to stop driving so as to cause the door body to remain in an opened state; and if the inductor moves to a position adjacent to the second induction switch, the second induction switch generates a second control signal configured to control the driving mechanism to stop driving so as to cause the door body to reset to a closed state,
the automatic switching system further including:
a box body configured to be installed on the one of the cabinet body or the door body, the box body including a first receiving portion and a second receiving portion;
wherein when installed:
the rack, the first induction switch and the second induction switch are positioned in the first receiving portion, a sidewall of the first receiving portion includes a notch, and the rack extends through the notch to eject the door body;
the driving device is positioned in the second receiving portion; and
the first induction switch is closer to the notch than the second induction switch.

14. The automatic switching system of claim 13, further comprising:
a sliding portion arranged in the second receiving portion and connected to the driving device;
a chute positioned on a side wall of the second receiving portion; and
a paddle arranged at a position where the sliding portion matches the chute, the paddle extending out of the second receiving portion through the chute,
wherein the paddle drives the transmission gear to disengage from the rack if the paddle is subjected to an external force.

15. The automatic switching system of claim 14, wherein, the box body is configured to be positioned in a containing groove on the one of the cabinet body or the door body, the containing groove being distal from a connection portion between the cabinet body and the door body.

* * * * *